United States Patent [19]

Julien et al.

[11] Patent Number: 5,408,723
[45] Date of Patent: Apr. 25, 1995

[54] SWIVEL WHEEL ASSEMBLY

[75] Inventors: Christine E. Julien, Reading; Devon T. Siesholtz, Boyertown, both of Pa.

[73] Assignee: Graco Children's Products, Inc., Elverson, Pa.

[21] Appl. No.: 176,495

[22] Filed: Jan. 3, 1994

Related U.S. Application Data

[63] Continuation of Ser. No. 840,712, Feb. 21, 1992, abandoned.

[51] Int. Cl.$^6$ .............................................. B60B 33/00
[52] U.S. Cl. .................................. 16/30; 16/31 R; 16/38; 16/43
[58] Field of Search ................ 16/18 R, 20, 30, 31, 16/37–39, 43, 47, 48

[56] References Cited

U.S. PATENT DOCUMENTS

| | | | |
|---|---|---|---|
| 10,331 | 5/1853 | Pederson | 16/47 |
| 266,509 | 10/1882 | Pederson | 16/47 |
| 314,961 | 3/1885 | Mendenhall | 16/48 |
| 388,460 | 8/1888 | Stengel | 16/47 |
| 1,015,572 | 1/1912 | Maier . | |
| 1,346,641 | 7/1920 | Ellsworth | 16/39 |
| 1,402,191 | 1/1922 | Thiele . | |
| 1,902,726 | 3/1933 | Schacht . | |
| 2,539,108 | 1/1951 | Shepherd | 16/18 |
| 2,995,770 | 8/1961 | Mullikin | 16/21 |
| 3,031,895 | 5/1962 | Kindig | 74/230.7 |
| 3,128,495 | 4/1964 | Tooth | 16/38 |
| 3,186,025 | 6/1965 | Kesterton | 16/18 R |
| 3,235,901 | 2/1966 | Rice et al. | 16/18 |
| 3,648,325 | 3/1972 | Cartwright et al. | 16/46 |
| 3,818,541 | 6/1974 | Daniels | 16/31 R |
| 4,110,866 | 9/1978 | Ishii | 16/35 R |
| 4,120,071 | 10/1978 | Crescenzi | 16/38 |
| 4,153,303 | 5/1979 | Tanner | 301/63 PW |
| 4,173,810 | 11/1979 | James | 16/47 |
| 4,348,785 | 9/1982 | Jordan | 16/46 |
| 4,351,084 | 9/1982 | Fontana | 16/45 |
| 4,377,883 | 3/1983 | Folson | 16/47 |
| 4,399,586 | 8/1983 | McCarroll | 16/31 R |
| 4,544,425 | 10/1985 | Provolo | 156/73.1 |
| 4,689,848 | 9/1987 | Kotzin | 16/31 R |
| 4,759,098 | 7/1988 | Ko | 16/29 |
| 4,793,021 | 12/1988 | Deasy et al. | 16/37 |
| 4,839,938 | 6/1989 | Coggin et al. | 16/45 |
| 5,062,178 | 11/1991 | Chiu | 16/38 |

FOREIGN PATENT DOCUMENTS

| | | | |
|---|---|---|---|
| 2107961 | 8/1972 | Germany | 16/38 |
| 2404903 | 8/1975 | Germany . | |
| 2532891 | 2/1977 | Germany . | |
| 2638877 | 3/1977 | Germany . | |
| 168064 | 9/1991 | Taiwan, Prov. of China | 16/38 |
| 3064 | of 1889 | United Kingdom | 16/38 |
| 0861883 | 3/1961 | United Kingdom . | |
| 1533982 | 11/1978 | United Kingdom | 16/43 |

Primary Examiner—Lowell A. Larson
Assistant Examiner—Donald M. Gurley
Attorney, Agent, or Firm—Pennie & Edmonds

[57] ABSTRACT

A swivel wheel assembly which is easy to assemble and convenient for use includes a tube plug inserted into a tube leg, a pivot pin inserted into the tube plug and a rotary member rotatably secured on the pin. The rotary member supports a shaft and pair of wheels. By using a hard material for the pin, a softer material for the rotary member and a still softer material for the tube plug, friction is reduced. The plug, pin and rotary member are assembled without the use of fasteners. The rotary member includes a resilient flexible member with a key received in a circumferential groove of the pivot pin.

10 Claims, 3 Drawing Sheets ial end of the plug 2, which assists in properly positioning the plug 2 in tube end 1. Plug 2 is provided with a pair of diametrically opposed, transverse slots 22, which extend more than halfway along the length of tubular wall from its remaining tubular end 23. The slots 22 are preferably tapered and, more specifically, of generally a V shape. End 23 of the tube plug 2 is first inserted into the tube leg 1, up to the flange 21. Then one longitudinal beveled end 32 forming the upper portion of the pivot pin 3 is pressed into the tube plug 2 through the flange end 21.

SWIVEL WHEEL ASSEMBLY

This is a continuation of application Ser. No. 07/840,712, filed Feb. 21, 1992, now abandoned.

FIELD OF THE INVENTION

The present invention relates to a swivel wheel assembly, in particular, to the improved structures of a swivel wheel assembly for a baby stroller.

BACKGROUND OF THE INVENTION

Casters or wheels are indispensable components for a baby stroller. Swivel wheel assemblies are presently well known in the art. However, known swivel wheel assembly structures cannot be put together without the use of fasteners. Moreover, most known swivel wheel assemblies have two large diameter plastic parts, usually nylon for strength, that contact each other and rotate relative to one another. One is fitted over the tube leg of the carriage. The second is fitted over the first and swivels around the first. Friction between the two nylon pieces impedes rotation. When grit or dirt gets into the contact area, both of the facing nylon surfaces tend to be damaged such that friction is noticeably increased and the assembly cannot be swiveled smoothly.

Accordingly, there is a need for an improved version of the swivel wheel assembly.

SUMMARY OF THE INVENTION

It is a primary object of the present invention to provide an improved swivel wheel assembly for a baby stroller.

It is another object of the present invention to provide a swivel wheel assembly which can be assembled without the use of separate fasteners, allowing for easier assembly and/or replacement of the assembly or its components.

It is a further object of the present invention to lower the parts count and to provide ease of wheel replacement to the consumer.

In one aspect, the present invention is an improved swivel wheel assembly mounted on a tube leg extending downwardly from the baby stroller and comprising: a tube plug having one end inserted into the tube leg; a pivot pin having one end inserted into the tube plug and an opposing end defining an annular groove; a rotary member with a longitudinally extending axial hole and a transversely extending hole; a shaft inserted through the transversely extending hole of the rotary member; and at least one wheel rotatably secured on the shaft. The invention is characterized in that the rotary member includes a projecting, resiliently flexible element with a positioning key received in the annular groove of the pivot pin, rotatably securing the rotary member to the pivot pin.

In another aspect, the invention is an improved swivel wheel assembly for installation in a tube leg extending downwardly from a carriage and comprises a tube plug having a tubular wall; a pivot pin having one longitudinal end received in one end of the tube plug and having an opposing longitudinal end defining an annular groove; a rotary member with a longitudinally extending axial hole receiving the pivot pin and a transversely extending hole, perpendicular to the axial hole, the rotary member including a projecting, resiliently flexible element and a positioning key on the element received in the pivot pin groove, rotatably securing the rotary member on the pivot pin; a shaft inserted through the transversely extending hole of the rotary member; and at least one wheel rotatably secured to the shaft.

These and other objects, advantages and features of the present invention will be best understood and appreciated by reference to the written specification and accompanying drawings.

BRIEF DESCRIPTION OF THE DRAWINGS

The present invention will be further explained with reference to the accompanying diagrammatic drawings, wherein.

DETAILED DESCRIPTION OF THE INVENTION

Figure 1:
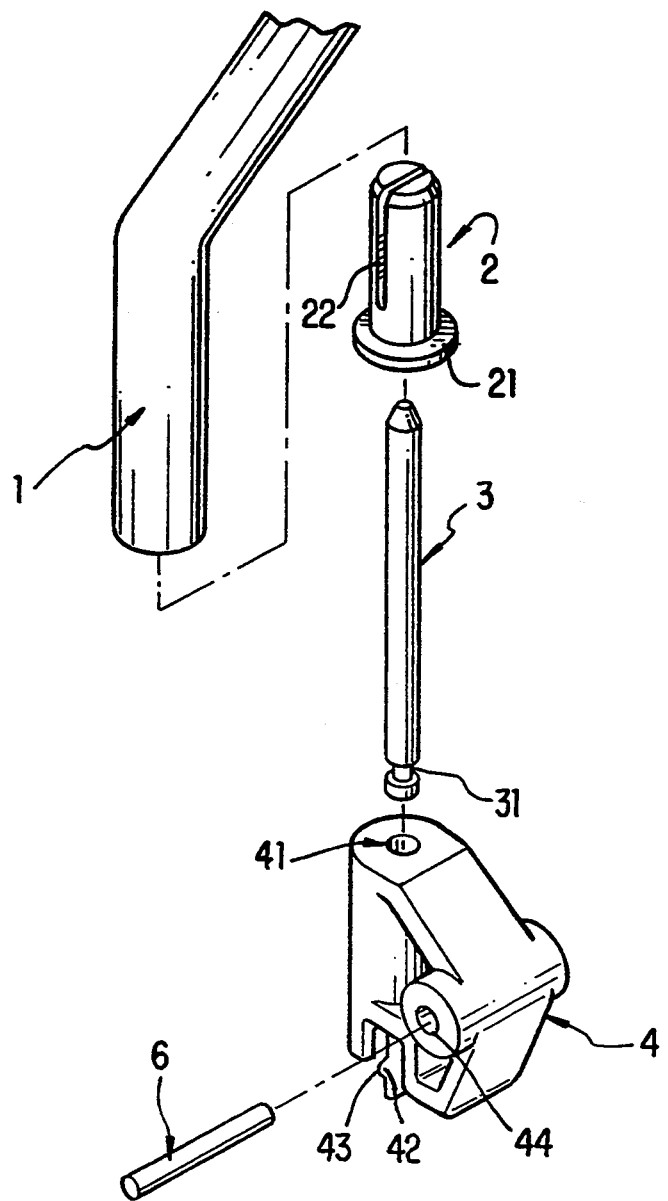
FIG. 1 is a perspective exploded view of a first embodiment swivel wheel assembly in accordance with the present invention.

Referring to the drawings in detail where like reference numerals indicate like elements.

Figure 2:
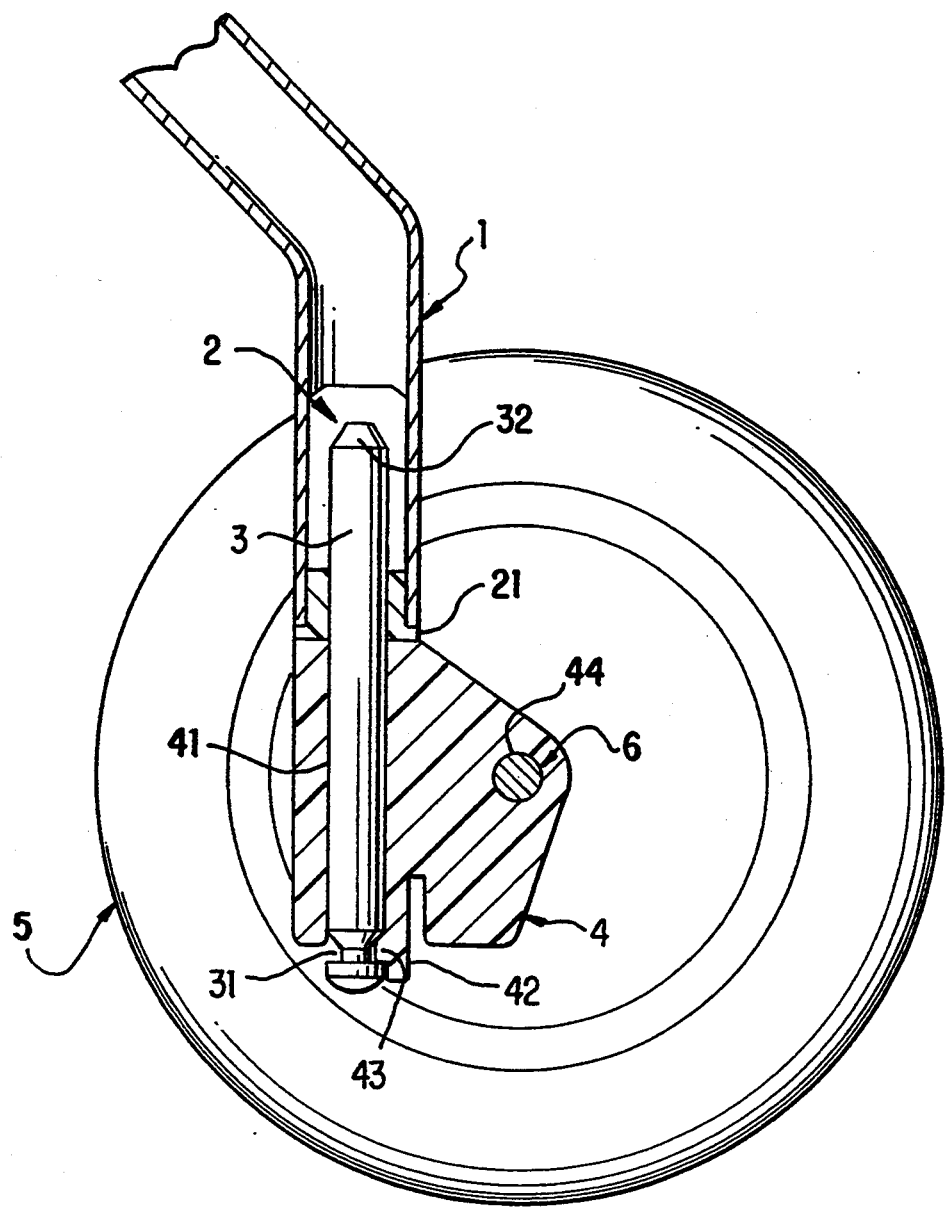
FIG. 2 is a cross-sectional view of the swivel wheel assembly of the present invention.

As shown in FIGS. 1 and 2, the improved swivel wheel assembly in accordance with the present invention is configured for receipt in a hollow tube leg 1, forming part of a stroller frame or leg of another hand-propelled, carriage-type vehicle, and includes a tube plug 2, a pivot pin 3, a rotary member 4, two wheels mounted in mirrored positions one on either side of rotary member 4, one of the wheels 5 being indicated in FIG. 2, and a shaft 6 supporting each wheel 5.

Figure 3:
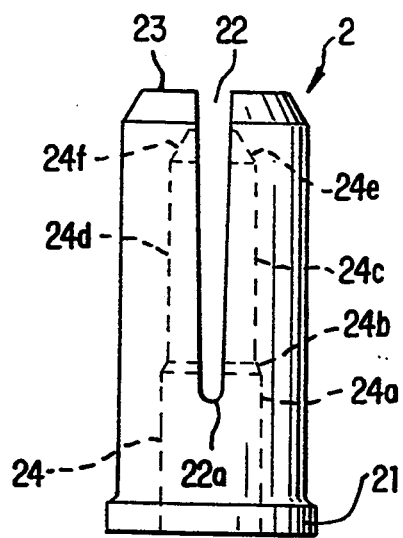
FIG. 3 is a side elevation of a preferred tube plug.
Figure 4:
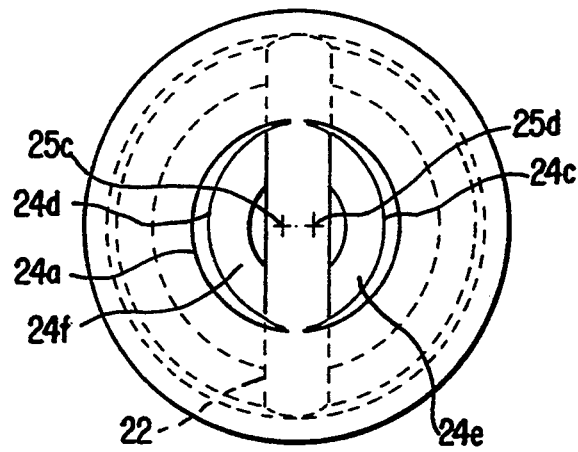
FIG. 4 is an end view of the plug of FIG. 3.

The tube plug 2 is a tubular element having a tubular wall of substantially constant outer diameter along its length except for a radially outwardly extending flange 21 preferably provided at one ax Referring to FIGS. 3 and 4, the tube plug 2 is shown in greater detail, including the configuration of its inner bore 24, which is depicted in phantom. Bore 24 includes a substantially circular portion 24a extending from flange end 21 to a step 24b beyond the apex 22a of slot 22. At step 24b, the diameter of the bore reduces. In addition, the centers of the radii of inner curving hemispherical surfaces 24c and 24d of the bore, above step 24b in the figures, are offset from the axial center line of the plug 2 to locations 25c and 25d, indicated specifically in FIG. 4. Uppermost end portions 24e and 24f of the bore taper down even further in diameter to approximate the shape of beveled upper end 32 of pin 3, to snugly receive that end of the pin 3. The space between the offset inner surfaces 24c, 24d is less than the outer diameter of the pin 3. These surfaces are biased outwardly by the pin 3 when the pin 3 is inserted into the plug 2. The upper portion of plug 2, being trapped between the inner circumference of the hollow tube leg 1 and outer diameter of pin 3, deforms to the degree required into the space defining slots 22 while providing firm, continuous contact between the surfaces 24c, 24d and the adjoining outer surface of the pin 3. Preferably, the fit between pin 3 and bore 24 is sufficiently tight that pin 3 needs to be inserted with a press or other tool providing sufficient mechanical advantage. The extremely tight fit provided by the design of plug 2 is of particular importance, as plug 2 is preferably made of an acetal resin material such as Delrin 100, which has a relatively low coefficient friction. Because of the clamping actions between the tube leg 1 and the tube plug 2 and between plug 2 and the pivot pin 3, the pivot pin 3 can be firmly mounted to the tube leg 1 solely by friction with this design.

The pivot pin 3 is preferably a metal rod, more specifically a chrome-plated steel rod, with an annular groove 31 formed at the lower end. The rotary member 4 is preferably a plastic material harder and stronger than the material of plug 2 and softer than the metal of pin 3, preferably a nylon 66. Rotary member 4 is preferably formed with a longitudinally extending axial hole 41 and a transversely extending hole 44, perpendicular to hole 41. The diameter of the axial hole 41 is slightly larger than that of the pivot pin 3. A resiliently flexible element 42 with a positioning key 43 is preferably integrally formed with the remainder of member 4, projecting from member 4, and provided on the lower side of the rotary member 4 adjacent to the axial hole 41. As the pivot pin 3 is inserted into the rotary member 4 through the axial hole 41, positioning key 43 engages with the corresponding annular groove 31 of the pivot pin 3 to rotatably secure the rotary member 4 on the pin 3, permitting the rotary member 4 to be swiveled about the latter. The wheels 5 can be rotatably mounted to the rotary member 4 by inserting the shaft 6 through the transversely extending hole 44 of the rotary member 4 and a central hole of each of the wheels 5. The wheels 5 can be rotatably secured on the shaft 6 in any conventional manner.

It should be noted that the swivel wheel assembly in accordance with the present invention can be assembled without the use of fasteners such as rivets and screws. Moreover, most current stroller swivel wheel assemblies have two large diameter nylon parts that may have disadvantageous contact and relative movement therebetween. As soon as grit or dirt gets into the contact area, the swiveling of the assembly becomes impeded because both surfaces tend to be damaged.

The swivel wheel assembly in accordance with the present invention operates better than existing swivel structures for several reasons. The first is that the present invention has small diameter contact surfaces between the harder metal pivot pin 3 and the relatively softer nylon rotary member 4, which reduces both the magnitude of the friction force and its moment area. The second is that Delrin, which is even more slippery than nylon, is preferably used in the plug 2, which rests on rotary member 4. This reduces the friction force between these elements. The third is that the introduced grit or dirt will not produce detrimental friction to the swiveling of the assembly due to the difference in hardness between the contact surfaces of pivot pin 3 with the rotary member 4 and between the rotary member and the plug 2. Only the softer of the facing surfaces tends to be damaged without significantly affecting friction between the parts. The use of plastics with different hardnesses is preferred but some improvement arises simply from the use of a small diameter metal pin with either type of plastic material or with comparable plastic material regardless of whether the rotary member 4 and plug 2 are of the same or of different plastic materials.

Figure 5:
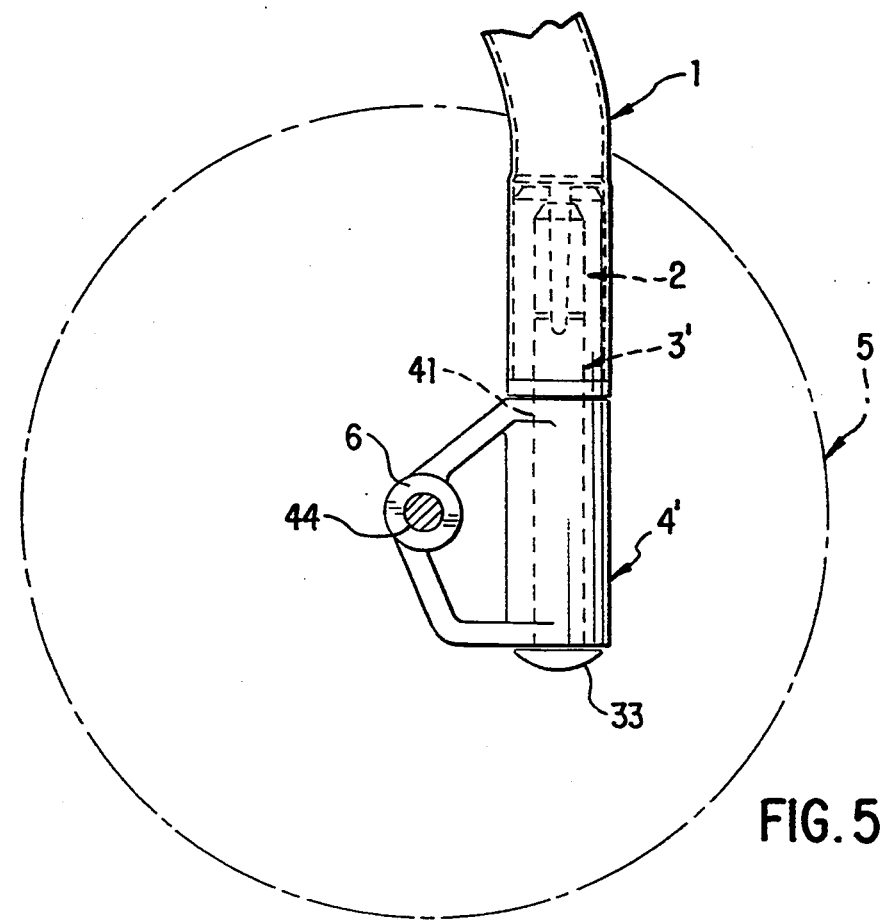
FIG. 5 is a side elevation of a second embodiment.

FIG. 5 depicts diagrammatically a second, alternate embodiment wheel assembly received in frame tube end 1 utilizing the same tube plug 2, wheels 5 and support shaft 6. Tube plug 2 receives a slightly modified pin 3' which, in turn, supports a modified rotary member 4'. Pin 3' differs from original pin 3 in that it lacks groove 31 of that pin at its lower end and instead substitutes an enlarged mushroomed head 33. Rotary member 4' is essentially solid, without the provision of resiliently flexible member 42 and key 43, retaining only axial hole 41 receiving pin 3' and transverse hole 44 receiving shaft 6. Again, rotary member 4' is preferably made of a material harder than plug 2 and softer than pin 3' again preferably nylon 66. Pin 3' is again preferably made from smooth metal such as a chrome-plated steel for strength and reduced friction.

In view of the above, the present invention not only provides a novel swivel wheel assembly for the baby stroller which can be assembled without the need of fasteners but also provides a swivel wheel assembly with low friction.

While only particular embodiments of the present invention has been shown and described herein, it will be appreciated that modifications thereof may be readily made thereto by those skilled in the art. We, therefore, intend by the appended claims to cover the modifications which fall within the true spirit and scope of our invention.

We claim:

1. A swivel wheel assembly for mounting to a structure, comprising:
 a rotary member having a first throughhole which extends completely through said rotary member and a second throughhole which extends transversely to said first throughhole and completely through said rotary member;
 a resiliently flexible element integral with said rotary member and extending from and beyond one end of said first throughhole, said flexible element having a positioning key protruding substantially perpendicularly from said flexible element;
 a pivot pin having an annular groove formed at one end thereof, said pivot pin being positioned in said first throughhole with said positioning key of said flexible element received in said annular groove to secure said pivot pin relative to said rotary member, the other end of said pivot pin extending beyond other end of said first throughhole, wherein said pivot pin is rotatable relative to said rotary member and readily removable from said rotary member by flexing said flexible member away from said pivot pin to disengage said positioning key from said groove and pulling said pivot pin out of said first throughhole;
 a shaft positioned in said second throughhole of said rotary member;
 at least one wheel rotatably secured on said shaft; and
 means for mounting said pivot pin to said structure.

2. A swivel wheel assembly of claim 1, wherein said pivot pin is made of metal material and said rotary member is made of plastic material, whereby the overall swivel friction is reduced due to the difference in hardness between the contact surfaces of said pivot pin and said rotary member.

3. A swivel wheel assembly of claim 1, wherein said resiliently flexible element extends substantially parallel to said first throughhole.

4. A swivel wheel assembly of claim 1, wherein said resiliently flexible element engages only partially around the pivot pin at said groove.

5. A swivel wheel assembly of claim 1, wherein said structure is a tubular structure and said mounting means comprises a tube plug which attaches to said other end of said pivot pin for inserting into said tubular structure.

6. A swivel wheel assembly of claim 5, wherein said pivot pin is formed of metal, and said rotary member and said tube plug are formed of plastic materials softer than the metal.

7. In a swivel wheel assembly which uses a tube plug for attaching the assembly to a tubular structure, the improvement comprising:

a rotary member having a first throughhole which extends completely through said rotary member and a second throughhole which extends transversely to said first throughhole and completely through said rotary member;

a resiliently flexible element integral with said rotary member and extending from and beyond one end of said first throughhole, said flexible element having a positioning key protruding substantially perpendicularly from said flexible element;

a pivot pin having an annular groove formed at one end thereof, said pivot pin being positioned in said first throughhole with said positioning key of said flexible element received in said annular groove to secure said pivot pin relative to said rotary member, the other end of said pivot pin extending beyond other end of said first throughhole for attaching said tube plug to mount said other end of said pivot pin to said tubular structure, wherein said pivot pin is rotatable relative to said rotary member and readily removable from said rotary member by flexing said flexible member away from said pivot pin to disengage said positioning key from said groove and pulling said pivot pin out of said first throughhole;

a shaft positioned in said second throughhole of said rotary member; and at least one wheel rotatably secured on said shaft.

8. An improved swivel wheel assembly of claim 7, wherein said pivot pin is formed of metal, and said rotary member and said tube plug are formed of plastic materials softer than the metal.

9. An improved swivel wheel assembly of claim 7, wherein said resiliently flexible element extends substantially parallel to said first throughhole.

10. An improved swivel wheel assembly of claim 7, wherein said resiliently flexible element engages only partially around the pivot pin at said groove.

* * * * *